United States Patent [19]

St. Marie

[11] Patent Number: 5,127,697
[45] Date of Patent: Jul. 7, 1992

[54] INCONSPICUOUS EXPANDABLE VAN

[76] Inventor: Normand St. Marie, 40 Homefield St., Lewiston, Me. 04240

[21] Appl. No.: 508,647

[22] Filed: Apr. 12, 1990

[51] Int. Cl.$^5$ .......................... B62D 33/08; B60P 3/39
[52] U.S. Cl. ............................................ 296/26; 296/16;
296/37.1; 296/37.5; 296/37.6; 296/165;
296/171; 296/175
[58] Field of Search .................... 296/26, 27, 164, 165,
296/171, 172, 175, 176, 37.1, 37.5, 37.6, 37.9,
16; 108/20, 21; 312/341.1; 384/17, 19

[56] References Cited

U.S. PATENT DOCUMENTS

| | | | |
|---|---|---|---|
| 2,284,419 | 5/1942 | Greig | 296/26 |
| 2,457,581 | 12/1948 | McCain | 296/171 |
| 2,545,269 | 3/1951 | Ford | 296/26 X |
| 2,995,398 | 8/1961 | Davenport | 296/26 |
| 3,726,422 | 4/1973 | Zelin | 296/26 X |
| 3,833,954 | 9/1974 | Daughenbaugh et al. | 296/171 |
| 3,888,539 | 6/1975 | Niessner | 296/26 X |
| 3,941,414 | 3/1976 | Platt | 296/27 X |
| 3,966,075 | 6/1976 | Schultz | 296/26 X |
| 4,103,462 | 8/1978 | Freller | 296/171 X |
| 4,133,571 | 1/1979 | Fillios | 296/26 X |
| 4,139,229 | 2/1979 | Cooper | 296/165 |
| 4,192,544 | 3/1980 | Patterson | 296/165 |
| 4,261,614 | 4/1981 | Rice | 296/171 |
| 4,397,497 | 8/1983 | Alonzo, Jr. et al. | 296/26 |
| 4,482,066 | 11/1984 | Dykstra | 211/151 |
| 4,824,158 | 4/1989 | Peters et al. | 296/37.6 |

FOREIGN PATENT DOCUMENTS

| | | | |
|---|---|---|---|
| 639854 | 7/1928 | France | 108/20 |
| 285732 | 2/1965 | Netherlands | 312/341.1 |

OTHER PUBLICATIONS

Goldenberg, Sherman, "Harrisburg Show Displays Styling Shift", *RV Business*, vol. 40, No. 14, Oct. 20, 1989, pp. 1, 7, 13.

*Primary Examiner*—Margaret A. Focarino
*Assistant Examiner*—Andrew C. Pike
*Attorney, Agent, or Firm*—Thomas L. Bohan

[57] ABSTRACT

The invention is an extendable compartment apparatus installed in a vehicle in such a manner that a platform can be cantilevered out from the vehicle body on an interlocking rail and bearing system. The apparatus includes a glidable platform, channel section stationary rails and angle section glidable rails. The glidable rails move along bearings which are located at the outermost end of the stationary rails and at the innermost end of the glidable rails, respectively. The glidable rails are limited in their movement such that they remain within the stationary structure along approximately one-third of their length. The platform can be mechanized using a DC motor and a rack-and-pinion gear system or worm gear. Finally, the glidable platform can be enclosed using side walls, a back wall, and a roof and thereby made weatherproof for use in combination with a camper vehicle.

13 Claims, 3 Drawing Sheets

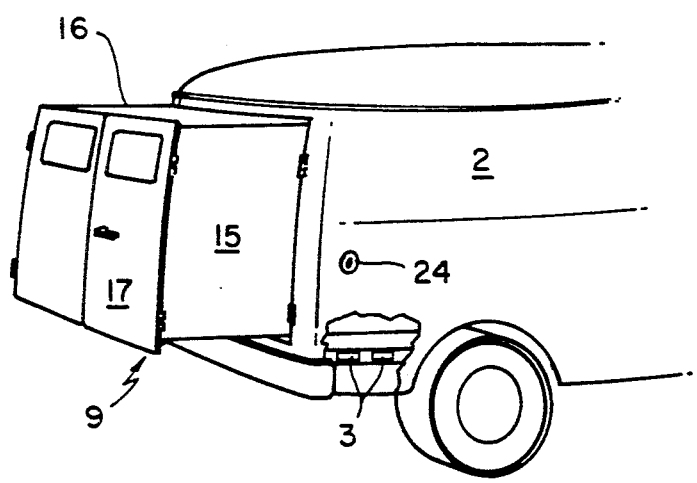
FIG. 1
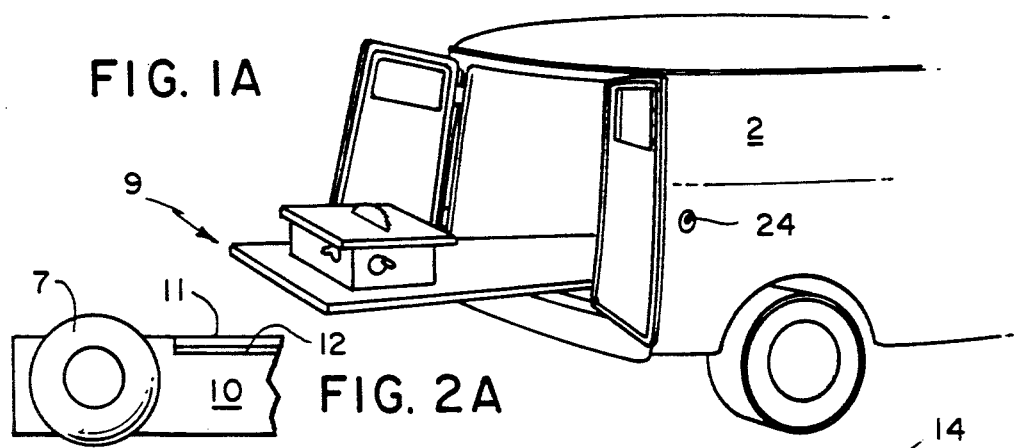
FIG. 1A
FIG. 2A
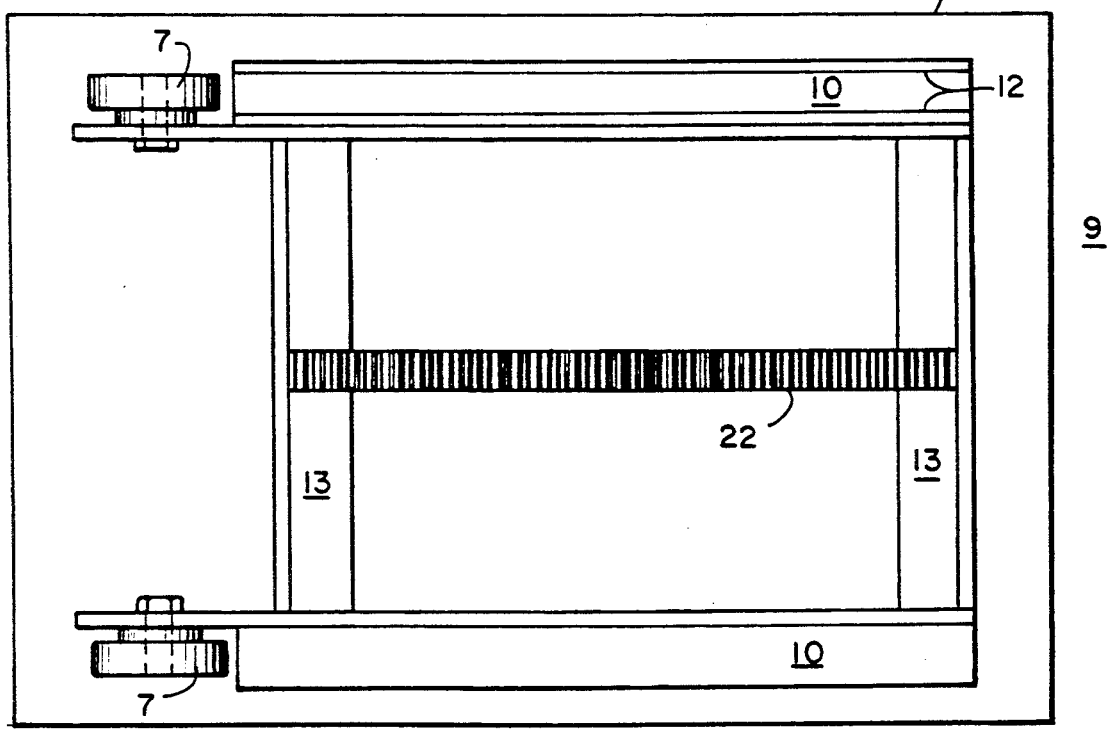
FIG. 2

INCONSPICUOUS EXPANDABLE VAN

BACKGROUND OF THE INVENTION

This invention relates in general to the field of expandable vehicles. More particularly, it relates to the fields of expandable camping vans and utility vehicles.

There have been numerous attempts to develop vehicles which are small enough to be comfortable to drive, but which—after reaching their destination—can be expanded to a size sufficiently large to constitute a comfortable camping and/or working environment. Prior to the present invention, these attempts have resulted in trailers, motor homes, and vans which are only enlarged through various complicated machinations and/or much effort on the part of their users. Furthermore, these prior vehicles are restricted to use at sites which have a fairly uniform surface, since the extensions have to be erected directly on the ground and/or through the use of jacks and other leveling supports. For example, U.S. Pat. No. 4,192,544 to Patterson discloses a telescoping extension for mounting on a vehicle. This extension rests on rails attached to the outside of the vehicle. As Patterson's extension is moved away from the bracing of these rails, small wheels must be lowered to the ground from the rear of the extension to avoid canting or outright collapse of the latter. Basically there is no support for the extension which is integral to the vehicle proper as the former is slid out from the latter.

U.S. Pat. No. 4,133,571 to Fillios is another example of the prior art. The expandable camper body of Fillios requires the hydraulic deployment of a support rack before the camper expansion can be put in place. Thus, for this system to work a site must be found which is not only uniform but of such a configuration that it will accept the fixed height of the support rack underneath the extension.

One expandable vehicle in the prior art that does not require external support is one involving a very complicated system of pulleys and wires, as disclosed in U.S. Pat. No. 4,103,462 to Freller. Freller's system requires the suspension of the outer extension of a camper by flexible tension members deployed from pulleys located near the top of the camper body. Another expandable apparatus that does not require external support, disclosed in U.S. Pat. No. 4,824,158 to Peters et al., is a means to access the rear of a vehicle. The structure disclosed by Peters fails to teach a system to support the loads inside a camper or utility vehicle, including a person or persons inside the vehicle. The Peters device is similar to the drawer of a dresser rather than an expansion of a vehicle.

Therefore, what is needed is a system useable in rough terrain for extending the interior space of camping and utility vehicles. What is further needed is such a system which is also very robust. A yet further need in the industry is a system which is very easy to operate, one which can be set up by one person in a very short period of time with no need of external supports.

SUMMARY OF THE INVENTION

The ultimate purpose to be served by the present invention is the provision of an expandable vehicle—in particular a camper or a utility vehicle—which is not externally distinguishable from other vehicles in its class while it is underway, yet which, once at its destination, can be easily enlarged in such a way that its hitherto compactly-arranged contents can be conveniently utilized. The heart of the invention is a movable section at the rear of the vehicle which glides longitudinally in and out of the vehicle proper in a telescoping fashion under the control of a single operator. This movable section is beam- and bearing-mounted in such a way that its movement is easily accomplished, either by hand or—preferably—with the assistance of an electric motor. When a motor is used to achieve the telescoping, it is coupled to the movable section by means of a rack-and-pinion arrangement, the rack gear being affixed to the movable section. A key aspect to the ease of operation of the invention is the lack of need for additional support elements even when the unit is fully telescoped out. A combination of internal strength and robustness of mount allows the movable section to be cantilevered from the vehicle proper with no extraneous support members. The setting-up operation is thus substantially independent of the nature of the surface underlying the vehicle.

It should be noted that in general-and especially in the case of a camper-the contents made more accessible by the vehicle expansion are located both in the movable section and in that part of the vehicle which remains fixed during the expansion. Camper items in the movable section might include beds and other sleeping facilities, whereas kitchen facilities, chemical toilet, and the like could be located in the fixed section. During travel these items in the fixed section are difficult to use because of the proximity of the movable section and its contents, but, once the vehicle's destination is reached and the expansion effected, ample space is available within the camper and in particular in the vicinity of the kitchen facilities.

More generally stated, the invention comprises (a) a stationary structure affixed to the interior of a vehicle, (b) a glider structure which travels longitudinally upon said stationary structure, (c) a means for moving said glider structure with respect to the stationary structure, and (d) a control mechanism which constrains the travel of said glider structure to certain limits with respect to said stationary structure. Simply stated, said stationary structure comprises a plurality of stationary rails which are rigidly fixed to said vehicle in such a manner that they are parallel to one another and aligned with the axis of said vehicle, which axis coincides by definition with the longitudinal direction of said invention. Each said stationary rail as fixed to said vehicle has a front end defined as the end of said stationary rail closer to the front of said vehicle, a back end defined as the end of said stationary rail closer to the rear of said vehicle, and two substantially horizontal flanges separated by at least one vertical member. (An example of said stationary rail is the American Standard Channel beam, or "channel beam" for short.) Said stationary structure further comprises at least one rotating bearing attached to the back end of each said stationary rail and positioned on said vertical flange between two of said horizontal flanges. The glider structure comprises a plurality of parallel, horizontal glidable rails, each rail having a front and a back end, at least one substantially horizontal flange and at least one vertical member, a rotating bearing attached to said front end of said glidable rail, said bearing extending above the plane of said horizontal flange, and each of said glidable rails further attached to a platform and arranged to engage said bearing of said glidable rail between said stationary rails.

BRIEF DESCRIPTION OF THE DRAWINGS

FIG. 1 is a perspective view of one use of the present invention—to enlarge the interior volume in an enclosed compartment. FIG. 1A is a perspective view of the present invention as a platform in a utility van.

FIG. 2 is a bottom view of an extendable compartment apparatus. This figure shows the glidable rails, bearings and gear rack. In FIG. 2A the forward end of one rail and its bearing position are detailed.

DESCRIPTION OF THE PREFERRED EMBODIMENT

Figure 3:
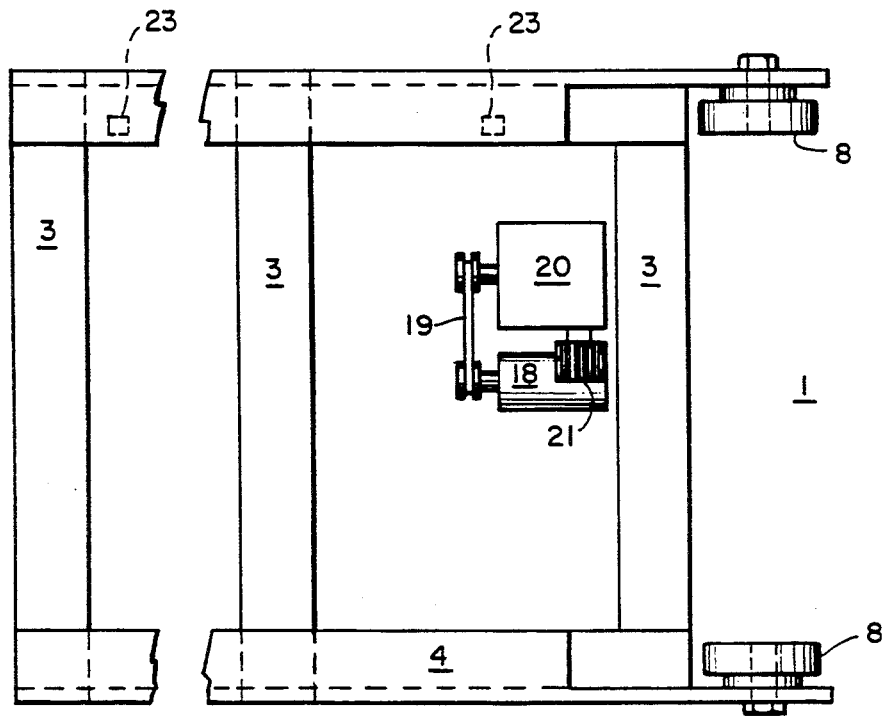
FIG. 3 is a top view of a stationary structure which includes members for attachment to said vehicle body and a motor mechanism to power said apparatus.

The present invention is directed towards an extendable compartment apparatus for a vehicle. In the preferred embodiment this vehicle is a camping vehicle of the type commonly referred to as a "camper." Typically, it is the type of camper which has a roof, two side walls and a back wall, the back wall having doors which open outward. Nevertheless, nothing in this description is intended to limit the invention's application to campers. Indeed, as will be clear, most of the configuration designated as the preferred embodiment can be taken over intact to provide an expandable compartment in a utility vehicle and the like employable by craftsmen such as electricians, plumbers, and carpenters. This comment applies in particular to the mechanism provided for conveniently telescoping the system in and out, with the particularization having to do more with the specific structure and equipage placed atop of the glider structure. As they are used in this application, the terms "glidable" and "gliding" are used rather than "slidable" and "sliding," respectively, to avoid the implication that the motion involves sliding friction.

More particularly, and as set out in FIGS. 1 to 3A, the preferred embodiment of this invention entails a stationary structure 1 which is secured to a vehicle 2 by transverse supports 3 affixed to said vehicle 2, to which transverse supports 3 the bottoms of stationary rails 4 are attached. Said supports 3 are affixed to said vehicle 2 using bolts, welding or other well-known fastening means. Said stationary rails 4 have two horizontal surfaces or flanges, and upper flange 5 and a lower flange 6, separated by a vertical member, as is presented, e.g., by a channel beam. Said stationary rails 4 are additionally placed as far apart transversely as possible and on edge with open channels of said stationary rails 4 facing towards the center of said vehicle 2 to which they are affixed. Further, said stationary rails 4 are milled to receive glider bearings 7. Said stationary rails 4 are preferably $3'' \times 2'' \times \frac{1}{4}''$ channel beams of A-36 steel.

Figure 3A:
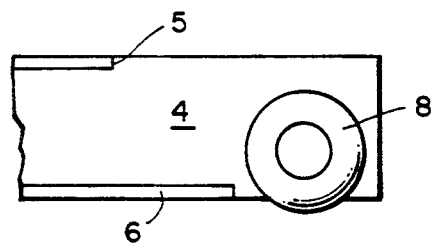
FIG. 3A is a detail of the back end of a stationary rail and bearing position.
Figure 5:
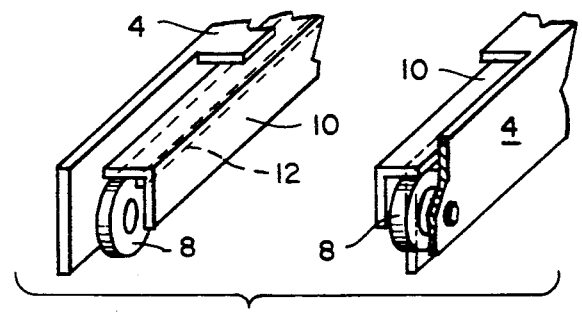
FIG. 5 shows a view of the relationship of stationary rails and their bearings, respectively, to glidable rails at the rear of said apparatus and vehicle.
Figure 4:
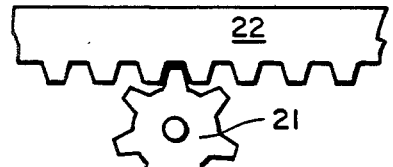
FIG. 4 is a plan view in detail of one possible method of driving said apparatus using a gear rack and drive gear.
Figure 6:
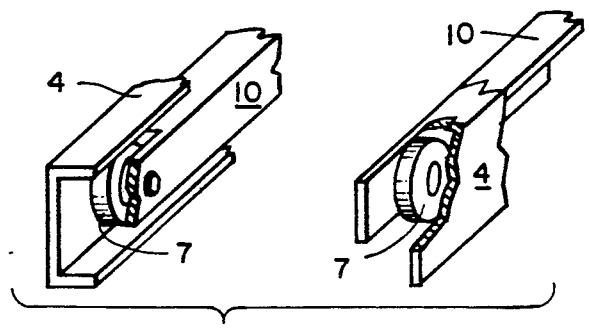
FIG. 6 shows a cut away view of the relationship of stationary rails to glidable rails and their bearings, respectively.

As illustrated in FIG. 3A said stationary unit also includes roller bearings 8 which are attached below the center line of a rear of said stationary rails 4. By "bearing" it is meant any structure which can be fixed with respect to an attached structure, but which is free to rotate in such an attached position providing support to a contacting structure. As illustrated in FIGS. 2, 3A and 6, portions of said flanges 5 and 6 at said rear of said stationary rails 4 are cut away which allows said bearings 7 of a glider structure 9 to be engaged over said bearings 8.

Said glider structure 9 consists of two parallel, horizontal glidable rails 10. Each of said glidable rails 10 has a vertical member and a horizontal flange 11, as is presented, e.g., by an angle beam. Said horizontal flange 11 of said glidable rails 10 ride on said bearings 8 of said stationary structure 1. As illustrated in FIG. 2A, portions of said horizontal flange 11 of said glidable rails 10 are cut away at a front of said rails 10 to allow said bearings 7 of said glider structure 9 free rotation. Additionally, there are two parallel, raised strips 12 running along the underside of the length of one of said horizontal flanges 11. Said strips 12 serve to keep said glider structure 9 in line with said stationary structure 1 during extension and retraction operations.

As illustrated in FIG. 2, said glidable rails 10 are held equally spaced by two perpendicular angle beams 13, one of said beams 13 positioned at a rear of said glider structure 9 and one attached approximately one-fourth of the distance from a front end of said glidable rails 10. Attached to a top of said glidable rails 10 and said perpendicular beams 13 is a platform 14. Said glidable rails 10 and said perpendicular beams 13 are preferably $2\frac{1}{2}'' \times 2'' \times \frac{1}{4}''$ angle beams of A-36 steel.

Further, as illustrated in FIG. 1, said glider structure 9 is enclosed by two side walls 15, a roof 16 and a back wall 17. Said two side walls 15, said roof 16 and said back wall 17 may be made of a rigid material such as wood, metal or plastic. Alternatively, said two side walls 15, said roof 16 and said back wall 17 may be made of a flexible material. To ensure a weather-tight seal between said glider structure 9 and said vehicle 2, a rigid, friction weather stripping well known to those skilled in the art is used.

Figure 7:
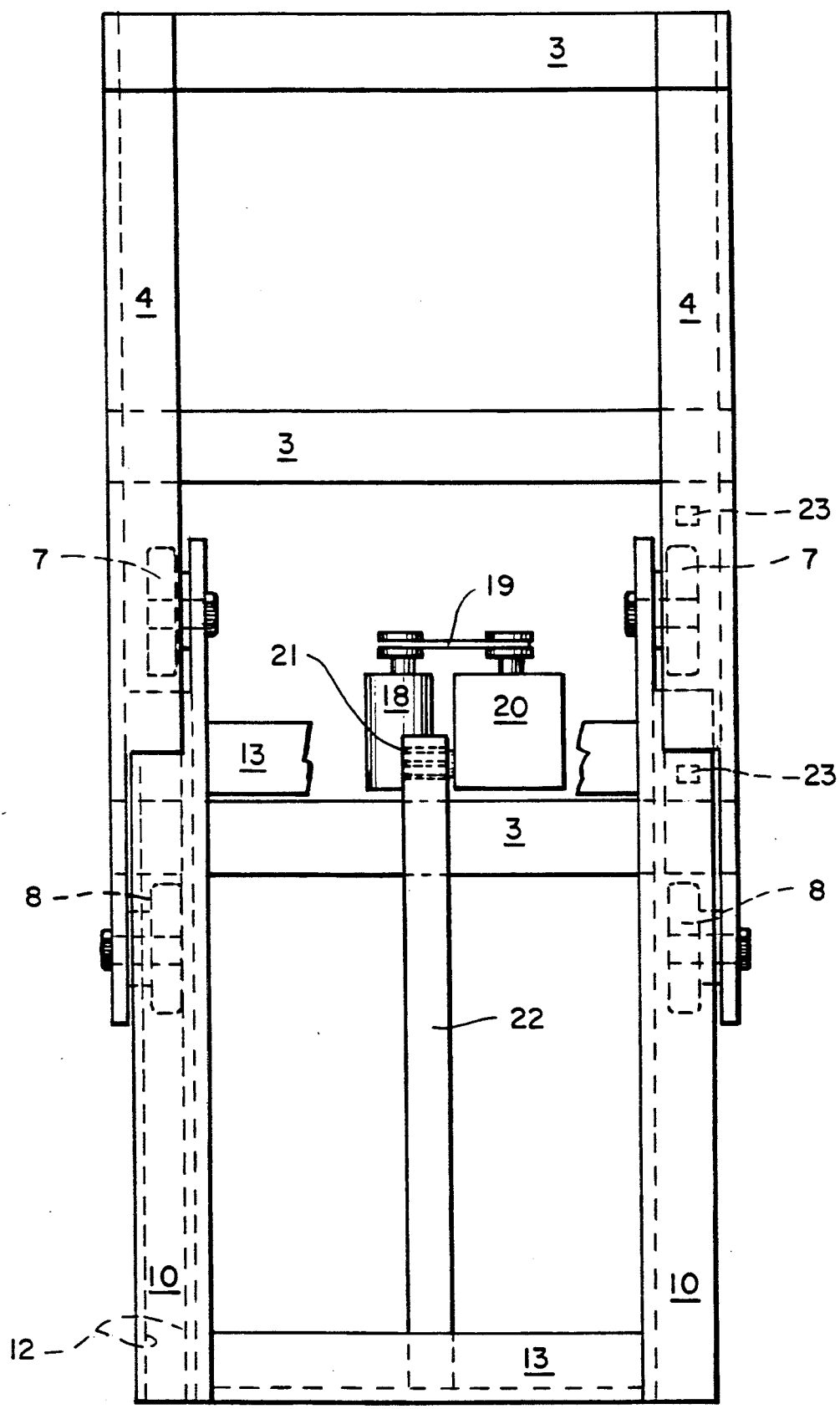
FIG. 7 is a top view of the entire stationary structure and glider structure in combination, with the glidable rails fully extended.

Additionally, as illustrated in FIG. 7, there is a means for moving said glider structure 9 with respect to said stationary structure 1. Said means includes a $\frac{1}{4}$ hp DC electric motor 18, a timing belt 19, a reduction unit 20 and a wheel gear 21 which are affixed to said vehicle 2 or said stationary structure 1, as well as a gear rack 22 which is attached to said glider structure 9. Said motor 18 is driven by said vehicle's electrical circuit or by an auxiliary battery.

Finally, as illustrated in FIG. 3, there is a control mechanism which constrains the travel of said glider structure 9 to certain limits with respect to said stationary structure 1. Said limits are controlled by pressure switches 23 which are attached to said vehicle 2 or said stationary structure 1 and positioned to engage said forward perpendicular angle beam 13 at the forward extent of travel and at the rearward extent of travel of said glider structuer 9. This allows an overlap between said stationary rails 4 and said gliable rails 10 along about one-third ($\frac{1}{3}$) of the length of said glidable rails 10, i.e. so that the maximum cantilevered overhang is equal to two-thirds of the length of said glidable rails 10. Additionally there is a key-operated switch 24 located at a rear exterior of said vehicle 2 which activates said motor 17.

What is claimed is:

1. An extendable compartment apparatus, for a vehicle of a type having (i) a floor, (ii) two side walls, (iii) a roof, and (iv) a back wall, wherein said back wall comprises doors which open outward, comprising:
   a. a stationary structure comprising
      i. a plurality of mutually parallel stationary rails, wherein each of said stationary rails has two substantially horizontal flanges, and wherein said flanges are perpendicular to, and separated from one another by, a vertical member,
      ii. a plurality of mutually parallel stationary supports transversely affixed to said stationary rails, wherein each of said stationary supports is affixed to said floor of said vehicle, and
      iii. a plurality of roller bearings, wherein one of said plurality of roller bearings is affixed to said vertical member of each of said stationary rails at a rear thereof,
   b. a glider structure, attached to said stationary structure, comprising
      i. a plurality of mutually parallel glidable rails, wherein each of said glidable rails has a horizontal flange and a vertical flange,
      ii. a plurality of mutually parallel structural angle beams transversely affixed to said glidable rails, wherein said structural angle beams holds said glidable rails equally spaced, and
      iii. a plurality of glider bearings, wherein one of said plurality of glider bearings is affixed to said vertical flange of each of said glidable rails at a front end thereof, and wherein each of said glider bearings extends above said horizontal flange of each of said glidable rails, and further, wherein each of said glider bearings is engaged between said horizontal flanges of said stationary rails,
   c. means for moving said glider structure along said stationary structure,
   d. a platform attached to said plurality of glidable rails, and
   e. a control mechanism which limits extension and retraction of said glider structure so as to ensure that said glidable rails remain engaged with said stationary rails for a length equal to at least one-third of a total length of said glidable rails.

2. The extendable compartment apparatus of claim 1 wherein said means for moving said glider structure along said stationary structure is automatic.

3. The extendable compartment apparatus of claim 2 wherein said means for moving said glider structure comprises an electric motor, a wheel gear, and a gear rack.

4. The extendable compartment apparatus of claim 3 wherein said means for moving said glider structure further comprises a reduction unit.

5. The extendable compartment apparatus of claim 1 wherein said stationary rails are of channel section.

6. The extendable compartment apparatus of claim 1 wherein said glidable rails are of angle section.

7. The extendable compartment apparatus of claim 1 wherein said glider structure further comprises side walls, a roof, and a back wall.

8. The extendable compartment apparatus of claim 7 wherein said side and back walls and said roof of said glider structure are rigid.

9. The extendable compartment apparatus of claim 8 wherein said side and back walls and said roof of said glider structure are made of wood.

10. The extendable compartment apparatus of claim 8 wherein said side and back walls and said roof of said glider structure are made of a plastic material.

11. The extendable compartment apparatus of claim 7 wherein said side and back walls and said roof of said glider structure are flexible.

12. The extendable compartment apparatus of claim 1 wherein said control mechanism comprises a plurality of switches affixed to said stationary structure and positioned so as to engage said structural angle beams, wherein said plurality of switches are connected to on/off controls so as to limit extension and retraction of said glider structure.

13. An extendable compartment apparatus, in combination with a camping vehicle of a type having (i) a floor, (ii) two side walls, (iii) a roof, and (iv) a back wall, wherein said back wall comprises doors which open outward, comprising:
   a. a stationary structure comprising
      i. two parallel stationary rails, wherein each of said stationary rails has two substantially horizontal flanges, and wherein said horizontal flanges are perpendicular to, and separated from one another by, a vertical member,
      ii. a plurality of mutually parallel stationary supports transversely affixed to said stationary rails, wherein each of said stationary supports is affixed to said floor of said camping vehicle, and
      iii. two roller bearings, wherein one of said two roller bearings is affixed to said vertical member of one of said stationary rails at a rear end thereof and the other one of said roller bearings is affixed to said vertical member of the other of said two stationary rails at a rear end thereof,
   b. a glider structure, attached to said stationary structure, comprising
      i. two parallel glidable rails, wherein each of said glidable rails has a horizontal flange and a vertical flange,
      ii. a plurality of mutually parallel structural angle beams transversely affixed to said glidable rails, wherein said structural angle beams hold said glidable rails equally spaced,
      iii. two glider bearings, wherein one of said two glider bearings is affixed to said vertical flange of one of said two glidable rails at a front end thereof, and the other of said two glider bearings is affixed to said vertical flange of the other of said two glidable rails at a front end thereof, wherein each of said two glider bearings extends above said horizontal flange of said two glidable rails, and further, wherein each of said two glider bearings is engaged within channels of said two stationary rails,
      iv. a platform attached to said two glidable rails, and
      v. a gear rack,
   c. an electric motor and a reducing gear affixed to said vehicle, wherein said reducing gear is engaged with said gear rack of said glider structure, and wherein said electric motor, said reducing gear, and said gear rack move said glider structure along said stationary structure,
   d. means to activate said electric motor, and e. a plurality of switches affixed to said stationary structure and positioned to engage said structural angle beams, wherein said switches are connected to on/off controls so as to limit extension and retraction of said platform, to ensure that said glidable rails remain engaged with said stationary rails for a length equal to at least one-third of a total length of said glidable rails.

* * * * *